United States Patent [19]
Hepler et al.

[11] Patent Number: 6,095,789
[45] Date of Patent: Aug. 1, 2000

[54] ADJUSTABLE HOT SPRUE BUSHING

[75] Inventors: Douglas C. Hepler; Christopher T. Grace; Louis A. Borrelli, all of Rochester, N.Y.

[73] Assignee: Polyshot Corporation, Henrietta, N.Y.

[21] Appl. No.: 09/169,114

[22] Filed: Oct. 8, 1998

[51] Int. Cl.[7] ................................................ B29C 45/20
[52] U.S. Cl. .................................. 425/549; 425/562
[58] Field of Search ................................ 425/549, 562

[56] References Cited

U.S. PATENT DOCUMENTS

| | | | |
|---|---|---|---|
| 4,034,952 | 7/1977 | Stewart | 249/105 |
| 4,266,723 | 5/1981 | Osuna-Diaz | 239/132 |
| 4,273,525 | 6/1981 | Reitan | 425/529 |
| 4,309,163 | 1/1982 | Cottancin | 425/543 |
| 4,563,149 | 1/1986 | Landis | 425/547 |
| 4,593,182 | 6/1986 | Schwarzkopf | 219/544 |
| 4,666,396 | 5/1987 | Shaw | 425/549 |
| 4,882,469 | 11/1989 | Trakas | 219/421 |
| 5,324,191 | 6/1994 | Schmidt | 425/549 |
| 5,334,006 | 8/1994 | Hepler et al. | 425/549 |
| 5,505,613 | 4/1996 | Krummenacher | 425/562 |
| 5,955,120 | 9/1999 | Deissler | 425/549 |

Primary Examiner—Tim Heitbrink
Attorney, Agent, or Firm—Francis J. Caufield

[57] ABSTRACT

A hot sprue bushing is provided for transporting plasticized material from an injection nozzle to a mold cavity while controlling the temperature of the plasticized material. This hot sprue bushing comprises an elongate body having a head, a stem and a distal end portion, and a through passage extending therethrough from end to end through the head, stem and distal end portion of the body for transporting plasticized material through the hot sprue bushing from the heat to the distal end portion thereof. The distal end portion of the body bears a first engaging device, and the head of the body is of greater cross-section than the stem so that the head provides a first abutment surface extending outwardly of the stem. An electrically powered heater is wrapped around the stem of the head in heating conducting relationship therewith. A sleeve surrounds the electrically powered heater; and a tip member has a second engaging device engaged with the first engaging device on the distal end portion of the body, the tip member having a second abutment surface engaged with one end of the sleeve so as to urge the opposed end of the sleeve into engagement with the first abutment surface on the head. The tip member permits egress of plasticized material from the through passage in the body.

19 Claims, 5 Drawing Sheets

ADJUSTABLE HOT SPRUE BUSHING

FIELD OF THE INVENTION

This invention in general relates to the field of injection molding and in particular to adjustable sprue bushings for conveying melted plastic from the nozzle to a mold cavity gate or runner system

BACKGROUND OF THE INVENTION AND PRIOR ART

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. On emerging from the nozzle, the plasticized compound is conveyed through a hole in a mold plate, usually stationary, by means of a sprue bushing (sprue for short) into the runner system or gate of the mold cavity. Once in the cavity, the resin, assuming the shape of the cavity, is cooled to the point where it is sufficiently solidified to retain the desired cavity shape. The mold is then opened, and the part ejected or otherwise removed. The entire process is usually automated, with the clamping of the mold parts prior to injection and unclamping for part ejection or removal after cooling taking place under the control of a microprocessor or other form of automated controller. Machines are rated by the number of ounces they will inject per piston or screw stroke and by the square inches of working area that can be clamped against injection pressure. Consequently, a machine can be used to fabricate a variety of different sized parts up to its maximum capacity. This is accomplished by using, among other things, plates of suitable thickness for the part at hand; large working areas and high injection pressures calling for robust mold plates to mount and sustain the large stresses created during the molding cycle. Plates used to make small parts, on the other hand, can be scaled down in size in accordance with the reduced stresses generated while molding them. Parts between the largest and smallest obviously require intermediate sized plates, and the industry has adopted standard plate thicknesses to promote productivity.

For best process performance regardless of part size, it is known to be beneficial to keep the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery is stiff run employing cold sprue bushings which allow the temperature of the resin to be poorly controlled from the time it leaves the nozzle until it reaches a zone in the mold where temperature control is reacquired with, for example, internal heating channels in the mold.

More sophisticated practice, apparently not yet universally accepted, recognizes the advantages of controlling temperature by employing hot sprue bushings to convey material from the nozzle to the cavity gate, often times through the fixed mold plate, sometimes referred to as the "A" plate or base. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

U.S. Pat. No. 5,312,824 entitled "ADJUSTABLE HOT SPRUE BUSHING" issued on May 25, 1993, and assigned to the same assignee as the present application, describes a hot sprue bushing of adjustable drop length so that it can be used in injection molding machines with a full range of different mold plate thicknesses to transport plasticized material from injection nozzles to mold cavities while controlling the temperature of the plasticized material. This hot sprue bushing comprises an elongate body having a head, a stem and a tip; the head has a reference seating surface which faces the tip. The elongate body has a through bore passing from end to end through the head, stem and tip of the body for transporting plasticized material through the sprue bushing from the head to the tip thereof. The body also has at least one non-through bore extending alongside the through bore, in heat conducting relationship with respect thereto; the or each non-through bore extends from the head through the stem and into the tip but is shorter than the elongate body. The or each non-through bore receives an electrically powered heating cartridge for controlling the temperature of the plasticized material as it travels along the through bore. In a preferred form of this hot sprue bushing, the body contains yet another bore which receives and positions a thermocouple substantially at the tip of the elongate body for controlling the temperature of the through bore over its full length.

Adjustment of the drop length of the hot sprue bushing is effected by means of a changing means manually positionable against the reference seating surface of the head and between this reference seating surface and the tip for shortening the initial drop length of the elongate body. This changing means has a mold plate seating surface selectively locatable over a predetermined range of distances between the reference seating surface and the tip to change the drop length of the hot sprue bushing, the changed drop length of the hot sprue bushing corresponding to the distance between the mold plate seating surface of the changing means and the tip. The hot sprue bushing may also have a cap which removably attaches to the head and has a recess having a shape complementary to that of standard injection nozzle shapes.

The adjustable hot sprue bushing of U.S. Pat. No. 5,213,824 gives good control of the temperature of the plasticized materials passing therethrough and is in commercial use. However, because the body of this hot sprue bushing needs to accommodate the through bore for the plasticized material, (typically) four bores for the heater cartridges and the bore for the thermocouple, the body needs to of substantial cross-section, and thus has a high thermal mass. This high thermal mass requires substantial heat input from the heater cartridges to maintain the proper operating temperature in commercial use, and thus the heater cartridges are subjected to a heavy duty cycle, which reduces the working life of the heater cartridges. Such cartridge failure results in substantial down time of the of the injection molding machine, since it is necessary to disassemble the hot sprue bushing in order to replace the failed heater cartridge. It has also been found that, in commercial use, the cap of the hot sprue bushing is easily damaged and detached from the head. Finally, in the hot sprue bushing of U.S. Pat. No.

5,213,824, the wiring for the heater cartridges emerges from the bushing on a bracket secured to the cap of the bushing, and thus immediately adjacent the injection nozzle, in which location the wiring is somewhat susceptible to damage.

It is an object of the present invention to provide a hot sprue bushing which allows control of the temperature of the plasticized materials passing therethrough similar to that of the bushing described in the aforementioned U.S. Pat. No. 5,213,824, but having a lower thermal mass so that the heater of the bushing can be operated at a lower duty cycle, and thus with an improved working lifetime, as compared with the heater cartridges used in this patent.

It is also an object of the present invention to achieve such a bushing with lower thermal mass which still permits location of a thermocouple adjacent the tip of the body for controlling the temperature of the through bore over its full length.

It is a further object of the present invention to achieve the aforementioned objects while still allowing adjustment of the drop length of the hot sprue bushing.

It is a further object of preferred embodiments of the present invention to eliminate the vulnerable cap of the hot sprue bushing of U.S. Pat. No. 5,213,824.

It is a further object of preferred embodiments of the present invention to allow the wiring for the hot sprue bushing to emerge from the injection molding machine at a point spaced from the bushing, thereby rendering this wiring less susceptible to damage.

Other objects of the invention will be apparent and will appear hereinafter in the following detailed description when read in connection with the drawings.

SUMMARY OF THE INVENTION

This invention provides a hot sprue bushing for transporting plasticized material from an injection nozzle to a mold cavity while controlling the temperature of the plasticized material. The hot sprue bushing of the present invention comprises an elongate body having a head, a stem and a distal end portion. This body has a through passage extending from end to end through the head, stem and distal end portion of the body for transporting plasticized material through the hot sprue bushing from the head to the distal end portion thereof The distal end portion of the body bears first engaging means, and the head of the body is of greater cross-section than the stem so that the head provides a first abutment surface extending outwardly of the stem. An electrically powered heater is wrapped around the stem of the head in heating conducting relationship with respect thereto. A sleeve surrounds the electrically powered heater, and a tip member has second engaging means engaged with the first engaging means on the distal end portion of the body, the tip member having a second abutment surface engaged with one end of the sleeve so as to urge the opposed end of the sleeve into engagement with the first abutment surface on the head. The tip member permits egress of plasticized material from the through passage in the body.

The body of the present hot sprue bushing only needs to accommodate the single bore through which the plasticized material passes, since the multiple heater cartridges of the bushing described in the aforementioned U.S. Pat. No. 5,213,824 are replaced by a single heater external to the body. Furthermore, since the sleeve need only be strong enough to retain the heater against the body, and to resist the compressive forces exerted on the sleeve by the tip member as it urges the sleeve into engagement with the abutment surface on the head, the sleeve can be made relatively thin.

Thus, the combined thermal mass of the body and sleeve of the present bushing can be made substantially less than that of a comparable bushing described in U.S. Pat. No. 5,213,824 having the same length and same diameter of through passage.

As described below with reference to the drawings, preferred hot sprue bushings of the present invention permit a thermocouple to be located adjacent the distal end portion of the body, in substantially the same location as the thermocouple of the bushing described in U.S. Pat. No. 5,213,824 without requiring the provision of a second passage within the body. Instead the thermocouple can be accommodated within a longitudinal groove provided on the outer surface of the body.

The present hot sprue bushing can be, and preferably is, provided with length changing means which act in the same manner as in the bushing described in U.S. Pat. No. 5,213,824 to adjust the drop length of the hot sprue bushing so that it can be used in injection molding machines with a range of different mold plate thicknesses.

BRIEF DESCRIPTION OF THE DRAWINGS

The structure and operation of the hot sprue bushing of the present invention, together with other objects and advantages thereof, may best be understood by reading the detailed description in connection with the drawings in which unique reference numerals have been used throughout for each part and wherein.

DETAILED DESCRIPTION OF THE INVENTION

Figure 1:
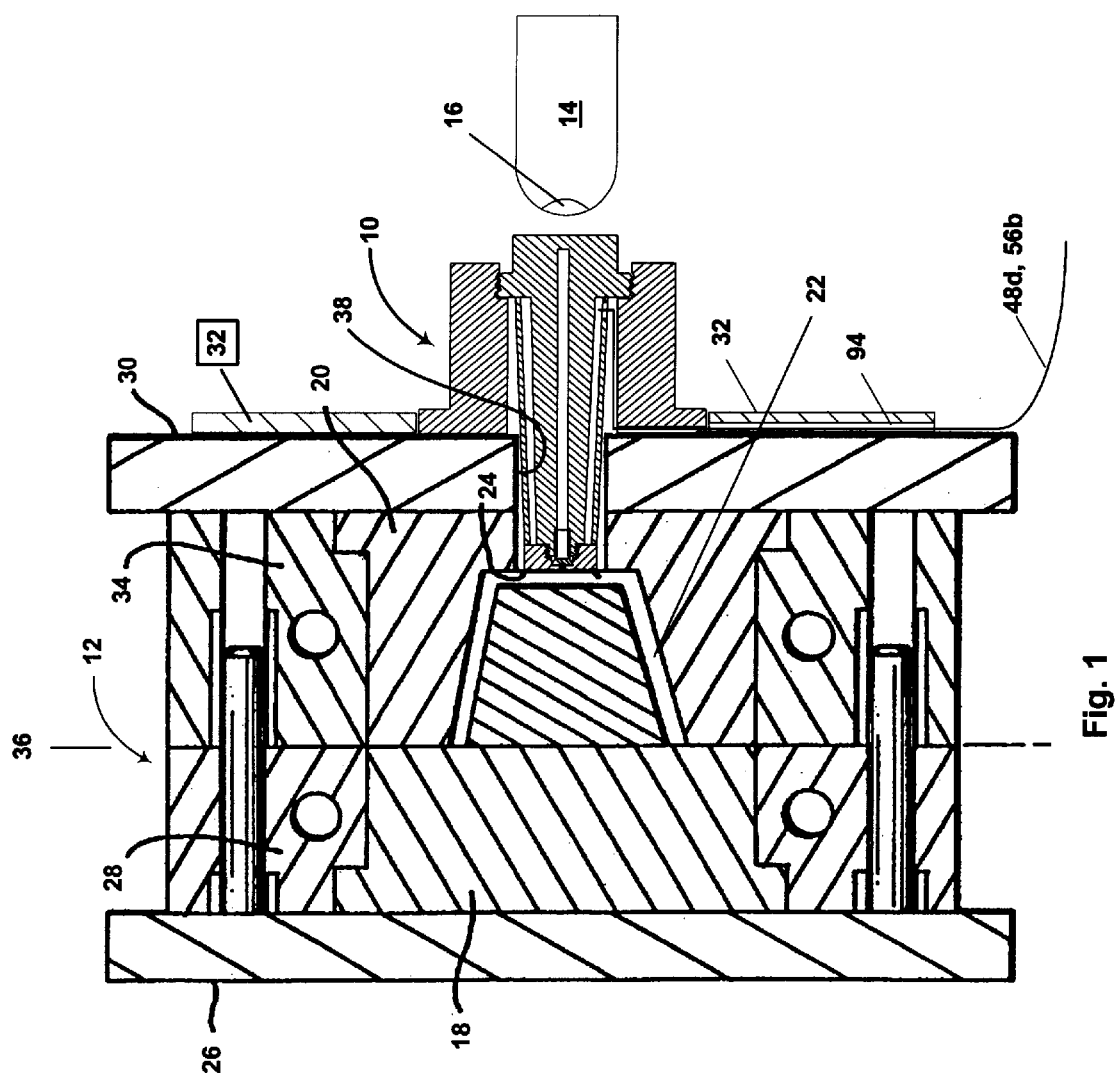
FIG. 1 is a diagrammatic cross-section through a hot sprue bushing of the present invention in use on a simple injection mold, and illustrates the path of the external connections to the hot sprue bushing.

FIG. 1 shows a preferred hot sprue bushing (generally designated 10) of the present invention in its operating position on a simple injection mold (generally designated 12), and with a nozzle 14 having an outlet 16 from which plasticized material is fed, via the hot sprue bushing into the mold 12. The nozzle 14 is typically fed by, for example, a reciprocating screw injection cylinder (not shown), in which either thermoplastic or thermoset materials are plasticized for travel through the outlet 16 of the nozzle 14.

The mold 12 comprises a core block 18 and a cavity block 20 which between them form a cavity 22 in the shape of the part to be molded. Entrance to cavity 22 is by way of an orifice 24 referred to as the cavity gate.

Core block 18 is fixedly mounted to a back-up mold mounting plate 26 via a retainer plate 28 and cavity block 20 is similarly mounted to a cavity retainer or stationary plate 30 and a top clamp plate 32 via a retainer plate 34. During the injection molding process, plates 26 and 30 are physically held in place against one another by clamping as with, for example, well-known hydraulically powered clamping arrangements (not shown) and in turn retain the cavity defining halves of mold 12 together under the injection pressure.

Once the plasticized material solidifies, plate 26 is customarily moved to break the mold at parting line 36, and the part is either removed or ejected. Plates 30 and 32 usually remains stationary during this process and hence may be referred to as stationary plates. The thickness of plate 30 has been standardized by industry practice where different thicknesses have been adopted to match different loadings generated while injecting parts of different size and projected area.

Connecting the cavity gate 24 and the orifice 16 of nozzle 14 is the hot sprue bushing 10 of the present invention, which can be adjusted as described below for use with either standard stationary plate thicknesses, stationary plates of custom thickness, or other custom lengths while also controlling the temperature of the plasticized material traveling through it. Hot sprue bushing 10 typically fits through either a standard three-quarter or one inch diameter hole 38 through stationary plate 30 for this purpose, but may be configured for other hole diameters as well.

Figure 2:
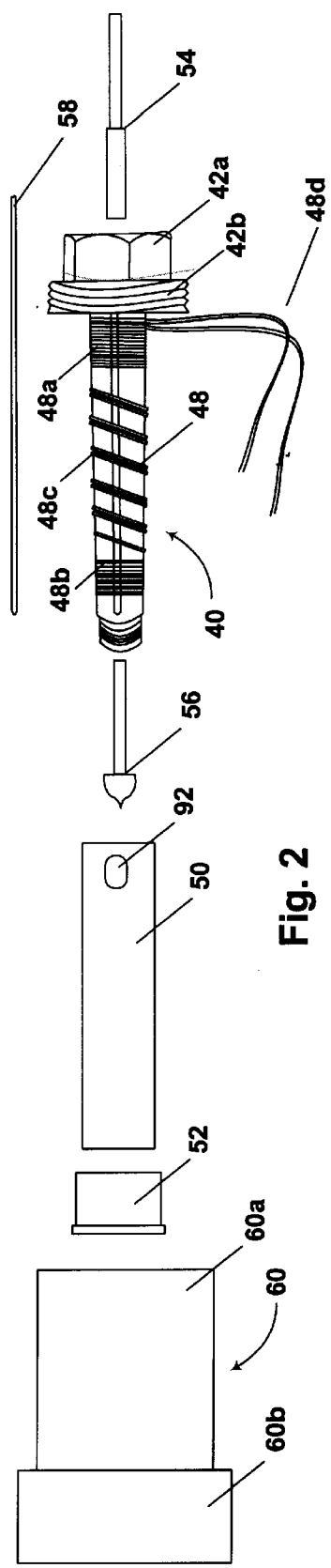
FIG. 2 is an exploded perspective view of the various parts of the hot sprue bushing shown in FIG. 1.
Figure 3:
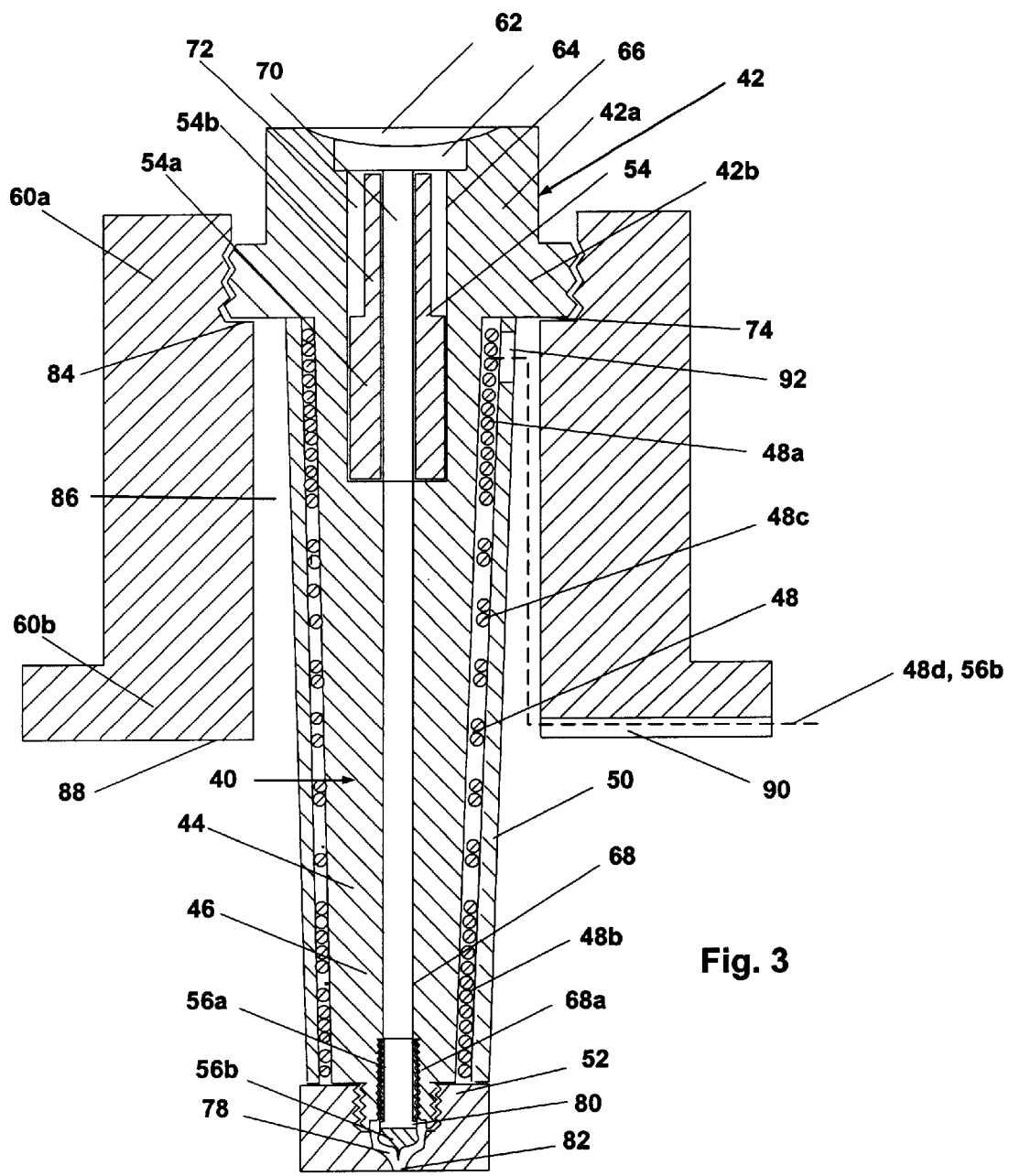
FIG. 3 is an enlarged cross-section through the hot sprue bushing shown in FIGS. 1 and 2 taken in a plane which includes the axis of the body of the bushing.
Figure 5:
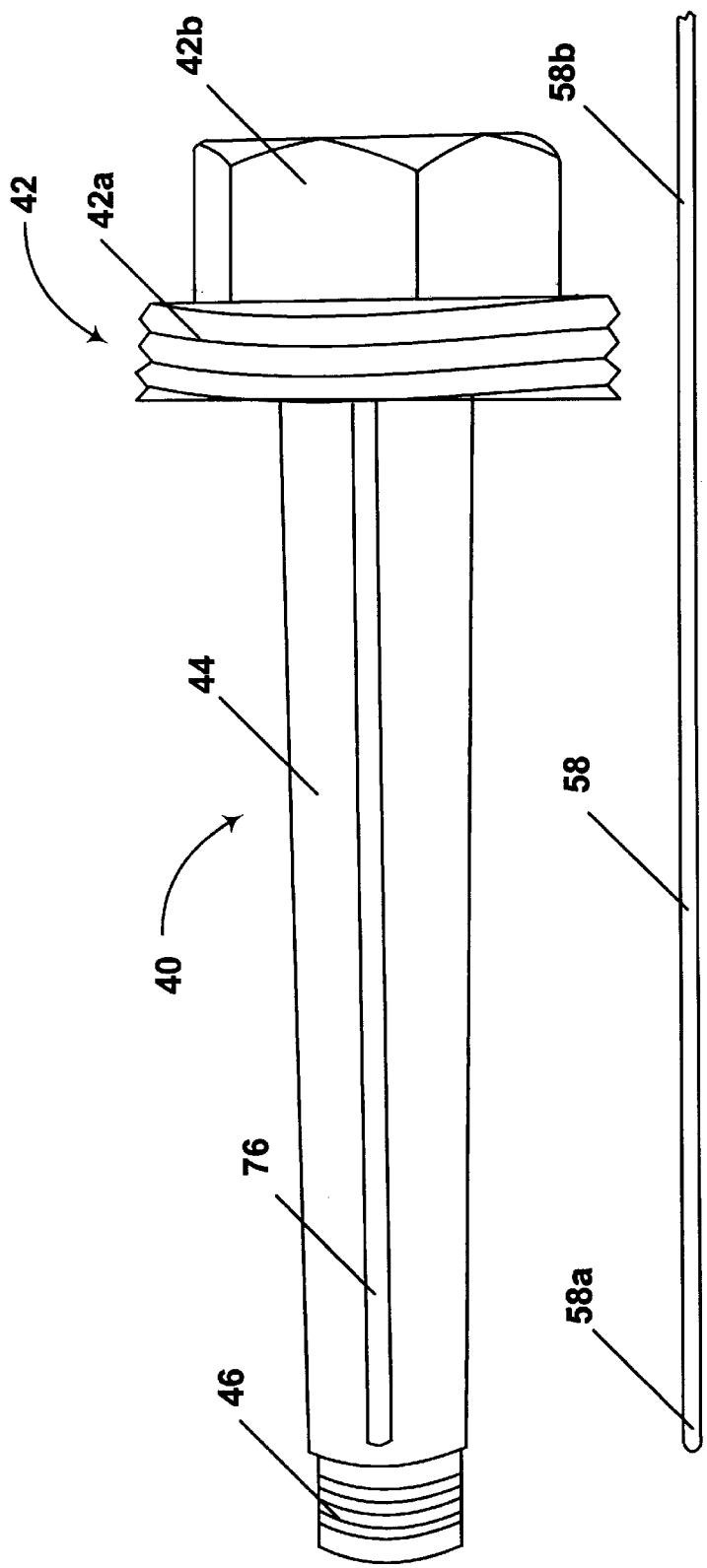
FIG. 5 is a side view of the body and thermocouple of the hot sprue bushing shown in FIGS. 1–4.

Referring now to FIGS. 2, 3 and 5, the hot sprue bushing 10 is seen to comprise an elongate body (generally designated 40) made of a single piece of steel that is preferably hardened to the same level as the stationary plates and mold halves to enhance its wearing characteristics and its reliability of operation. As best seen in FIG. 5, the body 40 comprises a head 42, which contacts the nozzle 14, a stem 44, and a distal end portion 46, which carries both internal and external threads. The head itself is divided into two parts, namely a hexagonal section 42a and an externally-threaded section 42b.

As best seen in FIG. 2, in addition to the body 40, the hot sprue bushing comprises an electrically powered heater 48, which is wrapped around the stem 44 of the body 40, a hollow sleeve 50, a tip member 52 provided with an internal thread capable of engaging the external thread on the distal end portion 46 of the body 40, a head insert 54 and a tip insert 56 (the purposes of which are explained below), a thermocouple 58 and a length changing member (generally designated 60).

The manner in which these components are assembled to form to hot sprue bushing is best seen in FIG. 3. For convenience hereinafter the terms "upwardly" and "downwardly" and analogous terms may be used with reference to the hot sprue bushing as shown in FIG. 3, i.e., "upwardly" means towards the nozzle 14, or "upstream" with regard to the direction of flow of plasticized material, while "downwardly" means toward the tip member 52, or "downstream" with regard to the direction of flow of plasticized material. As shown in FIG. 3, the hexagonal section 42a of the head 42 is provided with a part-spherical recess 62 into which the nozzle 14 fits. A substantially cylindrical recess 64 extends downwardly, axially of the body 40, from the recess 62, and a bore 66 extends axially from the recess 64, through the threaded section 42b of the head 42 and into the stem 44 of the body 40. A bore 68, of smaller diameter than the bore 66 extends axially from the bore 66 through the remaining part of the stem 44 and the distal end portion 46 of the body. Thus, together the recesses 62 and 64 and the bores 66 and 68 form a through passage extending from end to end through the head, stem and distal end portion of the body 40.

The head insert 54 is held within the bore 66, within which the head insert is a tight fit, the lower end of the head insert abutting the shoulder formed where the bores 66 and 68 meet. The head insert 54 has a central axial bore 70, which is of the same diameter as the bore 68, so that the bores 70 and 68 together form a single bore of constant diameter extending essentially the full length of the body 40. The insert 54 has two sections, namely a lower section 54a which is of substantially the same diameter as the bore 66 in which it is retained, and an upper section 54b, which is of smaller diameter than the bore 66, so that an annular cavity 72 is left between the outside wall of the upper section 54b and the wall of the bore 66. In use, plasticized material flowing from the nozzle 14 into the bore 66 enters the annular cavity 72 and acts as an insulator.

The head insert 54 is formed of beryllium copper, a material of very high thermal conductivity. The function of the head insert 54 is to supply heat to the plasticized material flowing through the head 42. As shown in FIG. 3, the heater 48 only extends around the stem 44 of the body 40, and does not extend around any portion of the head 42. Indeed, it is not possible to extend the heater around the head, since to do would interfere with the engagement (described below) between the threaded section 42b of the head and the length changing member 60. Accordingly, in the absence of the head insert 54, the plasticized material passing through the head within the bore 66 would be substantially cooler than that flowing through the stem within the bore 68. Such variation in temperature of the plasticized material within the hot sprue bushing is undesirable, since it may lead to difficulties in obtaining proper flow of the plasticized material through the hot sprue bushing. The high thermal conductivity head insert 54 conducts heat rapidly from its lower section 54a, which lies within the stem 44 and which is thus heated by the heater 48, to its upper section 54b, which lies within the head, and thus minimizes temperature differences between plasticized material in the head and that in the stem.

The stem 44 of the body 40 slightly tapers downwardly from its head end to its distal end so that it is narrower at its distal end is smaller than at its head end. The stem 44 is surrounded by the heater 48, which is in turn surrounded by the sleeve 50, which itself is slightly tapered to match the taper of the stem 44 (the tapers are shown exaggerated). The tip member 52 has an internal thread which engages the external thread on the distal end portion 46 of the body 40, and the radially outward part of the upper end surface of the tip member engages the lower end of the sleeve 50, thus pushing the upper end of the sleeve 50 into engagement with an abutment surface 74 on the underside of the threaded section 42b of the head 42. The sleeve 50 is sized so that it holds the heater 48 tight against the outside surface of the stem 44, thus ensuring good thermal contact between the heater and the stem. The taper of the stem and sleeve enhances this thermal contact between the heater and the stem. As will readily be apparent to skilled engineers, the hot sprue bushing 10 is assembled by first placing the heater 48 around the stem 44 and then progressively engaging the threads on the tip member 52 and the distal end portion 46 of the body 40. As these threads engage progressively, and the tip member 52 drives the upper end of the sleeve 50 into engagement with the abutment surface 74, the taper of the stem and the sleeve causes the heater 48 to be compressed around the stem 44, thus ensuring the required good thermal contact between these parts. Thus, the upper surface of tip member 52 operates to retain sleeve 50 in place while its lower or downstream end may be configured, if desired, as a gate interface.

As shown in FIGS. 3 and 5, the heater 48 is of substantially helical form, comprising a number of turns of resistance wire wrapped around the stem 44. However, the pitch between adjacent turns of wire is not constant along the length of the stem 44. Instead, the heater 48 has a head section 48a adjacent the head 42, a distal end section 48b adjacent the distal end portion 46 of the body, and a central section 48c lying between the head section 48a and the distal end section 48b. The pitch between adjacent turns of the heater is greater in the central section 48c than in the head and distal end sections 48a and 48b respectively. This variation in pitch of the heater is designed to keep the temperature of the stem, and hence of the plasticized material flowing through the stem, as uniform as possible. The head section 48a of the heater loses heat to the unheated head 42 of the body, and the distal end section 48b of the heater similarly loses heat to the unheated distal end section 46 and to the tip member 52, whereas no such heat loss occurs from the central section 48c of the heater. Accordingly, the head and distal end sections 48a and 48b respectively are required to generate more heat per unit length of the stem if the temperature of the stem is to be constant throughout, and hence these head and distal end sections 48a and 48b are provided with more turns per unit length (and thus have a lower pitch between adjacent turns) than the central section 48c.

The thermocouple 58 (see FIGS. 2 and 5), which is omitted from FIG. 3 for the sake of clarity, is arranged to monitor the temperature of the distal end portion 46 of the body, and thus of the plasticized material passing therethrough. As best seen in FIG. 5, the body 40 is provided with a longitudinal groove 76, and the thermocouple 58 is accommodated within this groove 76, with the tip portion 58a (the actual temperature sensing portion) of the thermocouple lying at the distal end of this groove, while the remaining wire portion 58b (which serves to connect the temperature sensing portion 58a of the thermocouple to an appropriate measuring instrument) runs along the groove 76 to a point adjacent the threaded section 42b, and is thence led out of the hot sprue bushing in a manner described below.

Returning to FIG. 3, it will be seen that a portion 68a of the bore 68, lying within the distal end portion 46 and an adjacent part of the stem 44, is enlarged in diameter and internally threaded. This internal thread on the bore portion 68a is engaged with an external thread on a hollow cylindrical section 56a of the tip insert 56; the central bore of this hollow cylindrical section 56a is of the same diameter as the main portion of the bore 68. A substantially conical section 56b of the tip insert 56 is integral with the hollow cylindrical section 56a and is disposed within a central cavity provided in the tip member 52, so as to leave an essentially "hollow conical" passageway 78 between the conical section 56b and the tip member 52. Apertures 80 extend radially through the lower end of the hollow cylindrical section 56a, thus connecting the bore 68 to the passageway 78, and allowing plasticized material to flow from the bore 68, through the apertures 80, the passageway 78 and an aperture 82 provided in the lower end surface of the tip member 52 into the mold cavity 22 (FIG. 1).

The tip insert 56 is formed of the same high thermal conductivity beryllium copper as the head insert 54 and functions in an analogous manner, permitting head flow from the heated stem 44 into the unheated distal end portion 46 and tip member 52, thereby providing head to the plasticized material passing though the distal end portion 46 and the tip member 52, and thus avoiding undesirable changes in temperature of the plasticized material within the hot sprue bushing.

Figure 4:
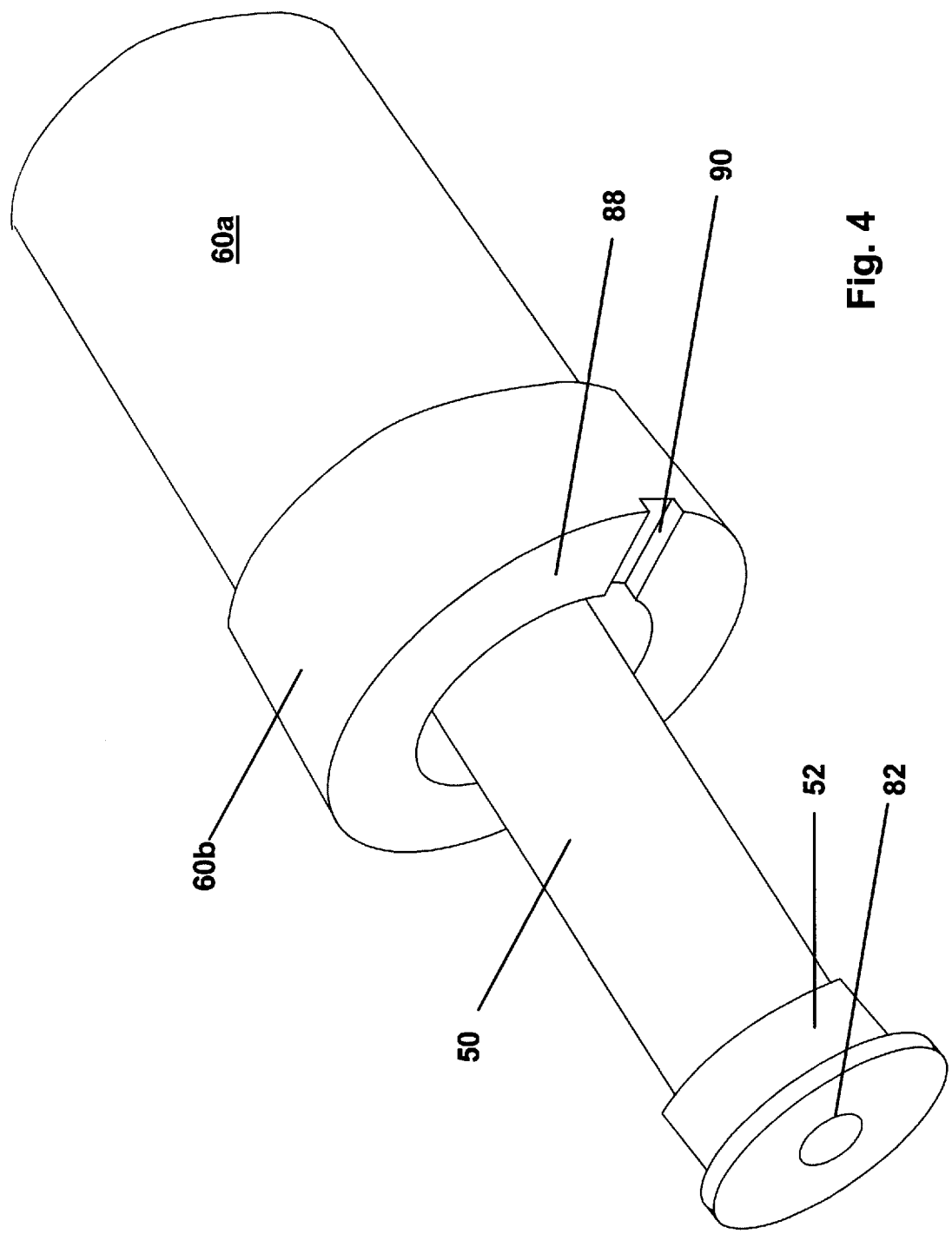
FIG. 4 is a three-quarter view, from the distal end and to one side, of the hot sprue bushing shown in FIGS. 1–3 in its assembled state.

As already mentioned, the length changing member 60 is provided to enable the effective drop length of the hot sprue bushing 10 to be varied. As shown in FIGS. 2 and 4, the changing member 60 has two sections both of which have essentially the form of hollow cylinders, namely an upper section 60a and a lower section 60b. Part of the upper section 60a carries the aforementioned internal thread which is engaged with the threaded section 42b of the head 42. Immediately below the threaded section 42b, the internal diameter of upper section 60a is reduced, thereby providing a shoulder 84, which abuts the radially-outward section of the abutment surface 74 on the threaded section 42b. This abutment of the shoulder 84 with the abutment surface 74 provides accurate control of the effective drop length of the hot sprue bushing 10.

As shown in FIG. 3, the internal diameter of the upper and lower sections of the changing member 60 below the shoulder 84 are the same, so that an annular cylindrical cavity 86, whose width tapers slightly, is left between the internal wall of the changing member 60 and the outer wall of the sleeve 50. The lower section 60b of the changing member terminates in an annular mold plate seating surface 88, which, as best seen in FIG. 4, is provided with a radially-extending hemicylindrical slot 90. As most easily seen in FIG. 1, the effective drop length of the hot sprue bushing 10 is the distance, measured axially of the bushing, between the mold plate seating surface 88 on the changing member 60 and the cavity gate 24 (FIG. 1), or in effect the distance between the mold plate seating surface 88 and the aperture 82 (FIG. 3). To enable this distance to be varied, the hot sprue bushing 10 may be provided with a plurality of length changing members 60 having varying distances between the shoulder 84 and the mold plate seating surface 88.

The manner in which external connections to the heater 48 and the thermocouple 58 are made will now be described with reference to FIGS. 1, 3 and 4. As already mentioned, the wire section 58b of the thermocouple extends along the groove 76 in the stem 44 to a point adjacent the threaded section 42b of the head. The wires 48d (FIG. 2) from the heater 48 are similarly led along the cavity between the sleeve 50 and the stem 44 to a point adjacent the threaded section 42b. The upper end of the sleeve 50 is provided with an aperture 92 (FIGS. 2 and 3), and the wire section 58b and the wires 48d are led through this aperture into the cavity 86 between the outer wall of the sleeve 50 and the internal wall of the changing member 60, and thence downwardly along this cavity 86, and through the recess 90 in the mold plate seating surface 88 of the changing member. This brings the wire section 58b and the wires 48d to the outer surface of the hot sprue bushing 10, and thence the path of the wire section 58b and the wires 48 is of course controlled by the design of the mold. Preferably, the top clamp plate 32 (FIG. 1) is provided with a recess 94 in its surface adjacent the plate 30, this recess forming a channel through which the wire section 58b and the wires 48 are led to emerge at a point well spaced from the hot sprue bushing 10, where they are less susceptible to damage.

The method of assembling the hot sprue bushing 10 will now be summarized, since it is believed to be apparent to those familiar with such bushings. The head insert 54 and the tip insert 56 are first placed in position within the body 40, the thermocouple 58 is inserted into the groove 76 and the heater 48 is placed around the stem 44. The sleeve is placed loosely around the stem 44, and the wire section 58b and the wires 48d of the heater are led through the aperture 90 in the sleeve. The tip member 52 is then screw threaded on to the distal end portion 46 until the upper end of the sleeve firmly abuts the surface 74 on the head 42. The hexagonal section 42a of the head is conveniently held in a wrench or clamp as the tip member is being engaged with the distal end portion of the body. The wire section 58b and the wires 48d are then manually placed against the outer surface of the sleeve and the changing member 60 is screw threaded on to the threaded section 42b of the head until the shoulder 84 on the changing member abuts the surface 74. The wire section 58b and the wires 48d are then manually placed in recess 90 on the changing member. When the hot sprue bushing 10 is being used with the mold shown in FIG. 1, the assembled hot sprue bushing is then placed in position on the mold, with the top clamp plate 32 removed, and the plate 32 is then replaced, while ensuring that the wire section 58b and the wires 48d are held within the recess 94 in the plate 32.

It will readily be apparent to those skilled in the art that numerous changes and modifications can be made to the preferred hot sprue bushing described above without departing from the scope of the invention. For example, the shapes of the tip member and the tip insert can assume a wide variety of forms so that the passageway through the tip member may have a form corresponding to any of the numerous forms of tip conventionally used in the injection molding art. Indeed, since it is only essential that the tip member engage the distal end portion of the body and hold the sleeve in position around the stem, the portion of the tip member extending below the distal end portion of the body can be eliminated if desired. In some cases, it may also be possible to eliminate the tip insert, with appropriate modifications of the form of the passage through the stem and of the distal end portion to provide any desired form of tip on the hot sprue bushing. Also, it will be seen that it is not necessary for the same abutment surface to be used for both the sleeve and the shoulder on the length changing member. The head 42 could be provided with two separate abutments surfaces spaced from one another along the axis of the body and radially thereof, or, for example, the upper end of the sleeve could be accommodated within an annular recess in the abutment surface. Indeed, as already indicated, the length changing member is only an optional feature of the present hot sprue bushing.

Those skilled in the art may make other changes to the invention without departing from the scope of its teachings. Therefore, it is intended that the embodiments described herein be considered as illustrative and not be construed in a limiting sense.

From the foregoing, it will be seen that the present invention provides a hot sprue bushing which provides temperature control of plasticized materials passing therethrough similar to that of the bushing described in the aforementioned U.S. Pat. No. 5,213,824. However, the present bushing has a lower thermal mass so that its heater can be operated at a lower duty cycle, and with an improved working lifetime. The present bushing also permits location of a thermocouple adjacent the tip of the body, while still allowing adjustment of the drop length of the hot sprue bushing. As already described, preferred bushings of the present invention eliminate the vulnerable cap of the bushing of U.S. Pat. No. 5,213,824, and allow wiring to emerge from the injection molding machine at a point spaced from the bushing, and chosen with regard to the design of any particular mold, thereby rendering this wiring less susceptible to damage.

What is claimed is:

1. A hot sprue bushing for transporting plasticized material from an injection nozzle to a mold cavity while controlling the temperature of the plasticized material, the hot sprue bushing comprising:

an elongate body having a head, a stem and a distal end portion, the body having a through passage extending therethrough from end to end through the head, stem and distal end portion of the body for transporting said plasticized material through the hot sprue bushing from the head to the distal end portion thereof, the distal end portion of the body bearing first engaging means, and the head of the body being of greater cross-section than the stem so that the head provides a first abutment surface extending outwardly of the stem;

an electrically powered heater wrapped around the stem of the head in heating conducting relationship with respect thereto;

a sleeve surrounding the electrically powered heater; and a tip member having second engaging means engaged with the first engaging means on the distal end portion of the body, the tip member having a second abutment surface engaged with one end of the sleeve so as to urge the opposed end of the sleeve into engagement with the first abutment surface on the head, the tip member permitting egress of plasticized material from the through passage in the body, the head being provided with a recess for receiving an injection nozzle, and a bore communicating with the recess and extending through the head and into the stem of the body, the bushing further comprising an insert having high thermal conductivity and secured within the bore, the insert having a substantially central aperture extending therethrough, which central aperture forms part of the through passage extending through the body.

2. A hot sprue bushing according to claim 1 wherein the insert comprises a material having high thermal conductivity.

3. A hot sprue bushing according to claim 1 wherein a portion of the insert adjacent the recess is of reduced cross-section, thereby leaving an substantially annular cavity between the outer surface of the reduced cross-section portion of the insert and the wall of the bore, so that plasticized material can enter this annular cavity and act as an insulator.

4. A hot sprue bushing according to claim 1 further comprising a length changing means manually engageable with the head so that the length changing means abuts a seating surface on the head and extends around part of the stem, the length changing means bearing, at the end thereof remote from the head, a mold plate seating surface capable of engaging the surface of a mold plate through which the body passes, thereby shortening the effective length of the hot sprue bushing.

5. A hot sprue bushing according to claim 1 wherein the heater comprises a plurality of turns of wire wrapped around the stem in a substantially helical configuration, the heater having a head section adjacent the head of the body, a distal end section adjacent the distal end portion of the body, and a central section lying between the head section and the distal end section, the pitch between adjacent turns of the heater being greater in the central section than in the head section and the distal end section.

6. A hot sprue bushing according to claim 1 further comprising a thermocouple located on the stem adjacent the distal end portion of the body so as to sense the temperature of plasticized material entering the distal end portion.

7. A hot sprue bushing according to claim 1 further comprising a tip insert having high thermal conductivity and secured within the distal end of the through passage in the body, the tip insert having walls defining at least one aperture through which plasticized material can passage from the through passage past the tip insert and out of the distal end portion of the body.

8. A hot sprue bushing according to claim 7 wherein the tip insert comprises beryllium copper.

9. A hot sprue bushing for transporting plasticized material from an injection nozzle to a mold cavity while controlling the temperature of the plasticized material, the hot sprue bushing comprising:

an elongate body having a head, a stem and a distal end portion, the body having a through passage extending therethrough from end to end through the head, stem and distal end portion of the body for transporting said plasticized material through the hot sprue bushing from the head to the distal end portion thereof, the distal end portion of the body bearing first engaging means, and the head of the body being of greater cross-section than the stem so that the head provides a first abutment surface extending outwardly of the stem;

an electrically powered heater wrapped around the stem of the head in heating conducting relationship with respect thereto;

a sleeve surrounding the electrically powered heater; and a tip member having second engaging means engaged with the first engaging means on the distal end portion of the body, the tip member having a second abutment surface engaged with one end of the sleeve so as to urge the opposed end of the sleeve into engagement with the first abutment surface on the head, the tip member permitting egress of plasticized material from the through passage in the body, wherein the stem of the body and the sleeve taper such that the cross-sections of the stem and sleeve adjacent the distal end portion of the body are smaller than their cross-sections adjacent the head, and wherein the second engaging means on the tip member can be progressively engaged with the first engaging means on the distal end portion of the body, whereby, as the second engaging means is progressively engaged with the first engaging means, the tapered sleeve presses the heater into contact with the stem, thereby ensuring good thermal contact between the heater and the stem.

10. A hot sprue bushing according to claim 9 wherein the heater comprises a plurality of turns of wire wrapped around the stem in a substantially helical configuration, the heater having a head section adjacent the head of the body, a distal end section adjacent the distal end portion of the body, and a central section lying between the head section and the distal end section, the pitch between adjacent turns of the heater being greater in the central section than in the head section and the distal end section.

11. A hot sprue bushing according to claim 9 further comprising a thermocouple located on the stem adjacent the distal end portion of the body so as to sense the temperature of plasticized material entering the distal end portion.

12. A hot sprue bushing according to claim 9 further comprising a tip insert having high thermal conductivity and secured within the distal end of the through passage in the body, the tip insert having walls defining at least one aperture through which plasticized material can passage from the through passage past the tip insert and out of the distal end portion of the body.

13. A hot sprue bushing according to claim 12 wherein the tip insert comprises beryllium copper.

14. A hot sprue bushing for transporting plasticized material from an injection nozzle to a mold cavity while controlling the temperature of the plasticized material, the hot sprue bushing comprising:

an elongate body having a head, a stem and a distal end portion, the body having a through passage extending therethrough from end to end through the head, stem and distal end portion of the body for transporting said plasticized material through the hot sprue bushing from the head to the distal end portion thereof, the distal end portion of the body bearing first engaging means, and the head of the body being of greater cross-section than the stem so that the head provides a first abutment surface extending outwardly of the stem;

an electrically powered heater wrapped around the stem of the head in heating conducting relationship with respect thereto;

a sleeve surrounding the electrically powered heater;

a tip member having second engaging means engaged with the first engaging means on the distal end portion of the body, the tip member having a second abutment surface engaged with one end of the sleeve so as to urge the opposed end of the sleeve into engagement with the first abutment surface on the head, the tip member permitting egress of plasticized material from the through passage in the body, a thermocouple located on the stem adjacent the distal end portion of the body so as to sense the temperature of plasticized material entering the distal end portion, the stem being provided with a longitudinally extending groove which receives the thermocouple and a wire connected therewith, the portion of the sleeve adjacent the head of the body having an aperture extending therethrough, and the wire extending through the aperture in the sleeve.

15. A hot sprue bushing according to claim 14 wherein the heater also passes through the aperture in the sleeve.

16. A hot sprue bushing according to claim 14 further comprising a length changing means engaged with the head so that the length changing means abuts a seating surface on the head and extends around part of the stem, the length changing means bearing, at the end thereof remote from the head, a mold plate seating surface capable of engaging the surface of a mold plate through which the body passes, thereby shortening the effective length of the hot sprue bushing, the mold plate seating surface being provided with a recess extending from the inner edge of the seating surface adjacent the step to the outer edge of the seating surface, and wherein the wire from the thermocouple extends from the aperture in the sleeve outside the sleeve but within the length changing means, and passes though the recess in the seating surface of the length changing means.

17. A hot sprue bushing according to claim 16 wherein the heater also passes through the aperture in the sleeve and thence outside the sleeve but within the length changing means, and passes though the recess in the seating surface of the length changing means.

18. A hot sprue bushing according to claim 14 further comprising a tip insert having high thermal conductivity and secured within the distal end of the through passage in the body, the tip insert having walls defining at least one aperture through which plasticized material can passage from the through passage past the tip insert and out of the distal end portion of the body.

19. A hot sprue bushing according to claim 18 wherein the tip insert comprises beryllium copper.

* * * * *